3,056,308
CHAINS FOR USE IN CONVEYOR SYSTEMS
Arthur Thomas Charles Burrows, Stevenage, England, assignor to Geo. W. King Limited, Stevenage, England, a British company
Filed Oct. 31, 1960, Ser. No. 66,051
Claims priority, application Great Britain Nov. 23, 1959
4 Claims. (Cl. 74—254)

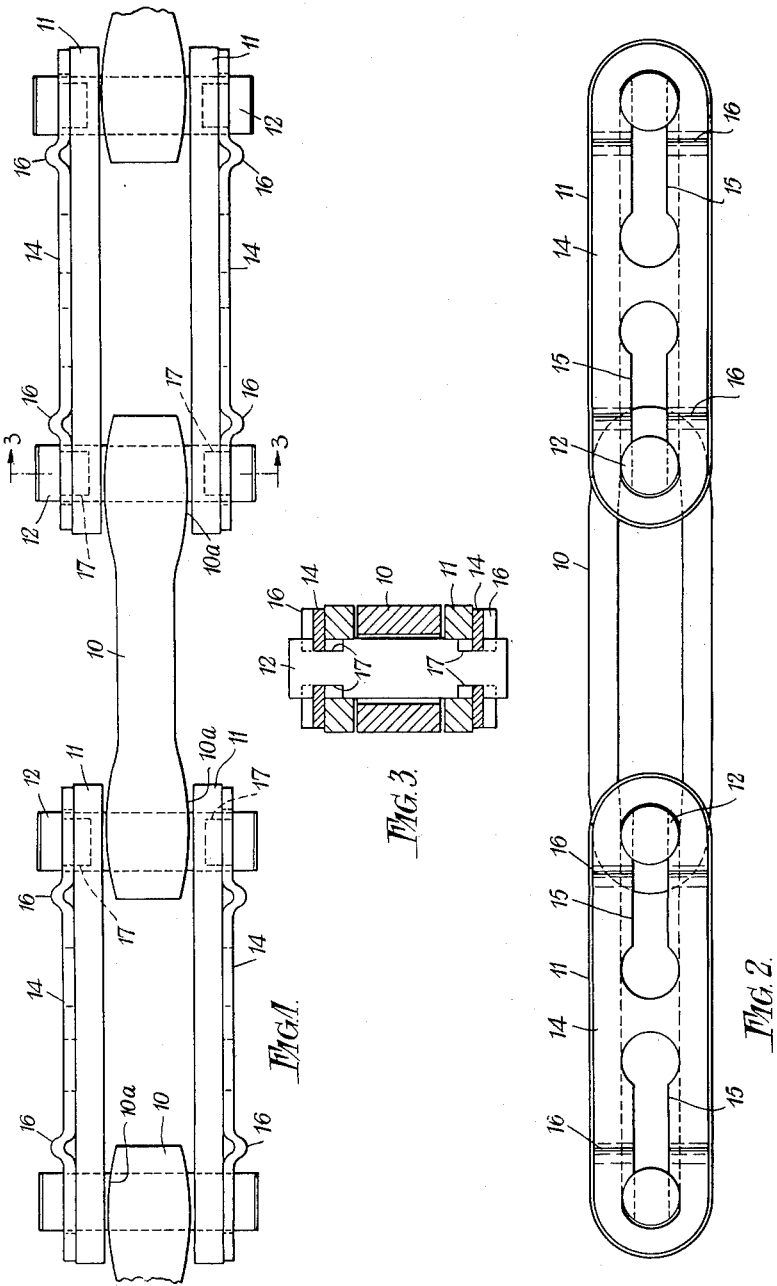

This invention relates to chains for use in conveyor systems and more particularly to chains of the type made up of a succession of so-called inner and outer links which are interconnected by means of connecting pins, more particularly, the outer links each comprise a pair of identical flat plate or strip like elements which are disposed in spaced parallel relation and the opposite end portions of which are arranged to overlap and thus sandwich between them end portions of the adjoining inner links.

According to the invention in a chain of the type referred to the connecting pins serving to connect the elements of each outer link to the two adjoining inner links are adapted when the chain is in an extended or operative condition to be retained in their operative positions by two retention plates which are applied one to each of the elements of said outer link. Each such plate is slotted to allow for the relative movement between said pins and said plates during assembly and dismantling of the chain. Each plate includes a rib which prevents relative movement of the plate and pin which would allow undesired displacement of the pins when the chain is in an operative condition. The ribs are conveniently produced by folding or kinking the plate. The connecting pins may conveniently each consist of a length of plain circular section rod having adjacent each end thereof a pair of diametrically opposed slots or recesses of a length in the axial direction of the rod greater than the overall thickness of the retention plate in the region of the rib or portion of increased thickness.

In order that the nature of the invention may be more readily understood one constructional embodiment will now be described with reference to the accompanying drawings in which:

FIGURE 1 is a side elevational view of a part of an assembled chain,

FIGURE 2 is a plan view of the chain shown in FIGURE 1,

FIGURE 3 is a cross sectional view on the line 3—3 of FIGURE 1.

Referring to the drawings it will be seen that the chain comprises a succession of inner links 10 and outer links 11 interconnected by connecting pins 12. The inner links 10 which are in the form of closed elongated loops, are, as clearly indicated in FIGURE 1 formed with end portions 10a of increased thickness. Said inner links, the form of which is generally well known may each be formed of two appropriately shaped strips bent to a substantially U shape, such U-shaped parts being butted together and subsequently welded. Each outer link 11 is in the form of a closed elongated loop which may be stamped from bar or strip material or may be constituted by two substantially U-shaped parts which are butted together and welded.

A retention plate 14 is provided for each outer link element. Plates 14 may be stamped from a metal strip. Each retention plate 14 is formed with two oppositely disposed keyhole slots 15 and is also formed adjacent each end with a transverse rib or the like 16. The connecting pins 12 which are made from a plain circular rod are each provided adjacent each end as can be clearly seen from FIGURE 3 with a pair of slots or recesses 17 the length of which is greater than the overall height of the ribs 16 of the retention plates 14. The ribs 16 are misaligned with respect to the recesses 17 when the outer link is positioned over the end portions 10a, consequently any relative displacement between the pin 12 and plate 14 is resisted by the ribs 16.

In the drawings it can be seen that by turning, for example, the left hand outer link 11 at right angles to the inner link 10 in a horizontal plane and sliding the same together with the pin 12 along said inner link until the upper and lower elements of the outer link are located one above and one below the waisted portion of the inner link, the elements of the outer link and the retention plates 14 associated therewith may be held together aligned with respect to recess 17 and pushed across the inner link transversely with respect to the length of the latter. During this movement the ribs or the like 16 of the retention plates 14 will pass through the recesses 17 in the connecting pin 12 and eventually the latter will be located in the enlarged portion of the keyhole slots 15 of the upper and lower plates 14 whereupon said pin may be withdrawn thereby to effect disconnection of the outer and inner links. On assembly of the chain the reverse procedure to that above described will be adopted.

The retention plate 14 may be so formed that the distance over the outer ends of the keyhole slots 15 will be appreciably greater than the distance over the connecting pins 12, thereby to ensure that said plates will not be directly loaded when the chain is in use. Alternatively said plates 14 may be so made that the distance over the outer ends of the keyhole slots is substantially equal to the distance over the connecting pins so that said plates will assist the elements of the outer links in withstanding any load applied to the chain.

With a chain constructed in the manner above described and illustrated the connecting pins may be made from accurate round bar with a minimum of machining the only operations necessary being parting off and production of the slots or recesses 17. There will be no forging flashes as has been the case with connecting pins employed in similar types of chain hitherto. Furthermore the pins may be machined from heat treated bar or heat treated after machining since the simple shape will cause a minimum of difficulty.

Each of the elements of the outer links may be provided with a stiffening cross bar at substantially the middle of its length which will effectively divide the elongated slot defined by such element into two shorter slots each somewhat longer than the keyhole slots in the retention plate.

It may be pointed out here that a chain assembled in the manner hereinbefore described and illustrated cannot become disconnected if the method of dismantling above described is followed. In other words there is little or no possibility of any undesired disconnection of links.

What is claimed is:

1. A chain comprising alternating first and second links, the first link being constituted by an element having a slot therein, the first link including opposite end portions of enlarged thickness, the second link comprising a flat member provided with a slot substantially as wide as that of the first link, said member overlaying one of the end portions of the first link such that the slots of the member and the first link are coincident in part, a pin having a diameter smaller than the width of the slots extending through the coincident slots in a direction substantially perpendicular to the links, a plate on the member of the second link, said pin having a recess, said plate having a slot therein having a width wider than said pin at said recess but narrower than the diameter of the pin, said plate at said slot extending in said recess to support said pin, and a rib on said plate, said recess having a height sufficient to enable passage therethrough of the plate and rib, said rib being misaligned with respect to said recess to be blocked from entering the same with the pin positioned at one of the ends of enlarged thickness of said first link.

2. A chain as claimed in claim 1 wherein said second link comprises another of said flat members, both said members overlying one of the end portions of the first link to sandwich the first link between said members, said pin extending through both said members and said first link, the chain further comprising a second plate on the other of said members and substantially identical to the first said plate.

3. A chain as claimed in claim 1 wherein said first link includes a narrow intermediate portion between the end portions, the rib being adapted for being aligned with said recess in the pin to permit relative displacement of said plate with respect to said pin with the pin positioned in the intermediate portion of the first link.

4. A chain as claimed in claim 3 wherein the slot in the plate is constituted by a hole having a diameter larger than that of said pin and a rectangular opening extending into the hole to form a slot of keyhole shape, said rectangular opening having a width wider than said pin at said recess but narrower than the diameter of said pin, said pin normally being supported by the plate at the rectangular opening, said pin and said plate being slidable relative to one another with the rib aligned with the recess in the pin to permit said pin to enter said hole whereby said pin can be removed from said plate.

References Cited in the file of this patent

UNITED STATES PATENTS

| | | |
|---|---|---|
| 1,589,201 | Meier | June 15, 1926 |
| 1,707,204 | Thuerman | Mar. 26, 1929 |
| 2,298,604 | Webb | Oct. 13, 1942 |
| 2,775,156 | Imse et al. | Dec. 25, 1956 |

FOREIGN PATENTS

| | | |
|---|---|---|
| 27,253 | Great Britain | 1896 |